Aug. 7, 1945.  K. M. JONES  2,381,288
NUT CRACKING DEVICE
Original Filed Aug. 7, 1937  2 Sheets-Sheet 1

INVENTOR
KARL M. JONES
BY Frederick Griswold Jr.
ATTORNEYS

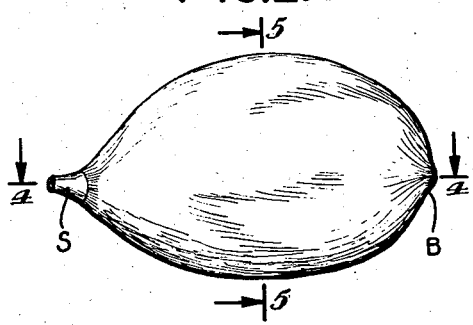
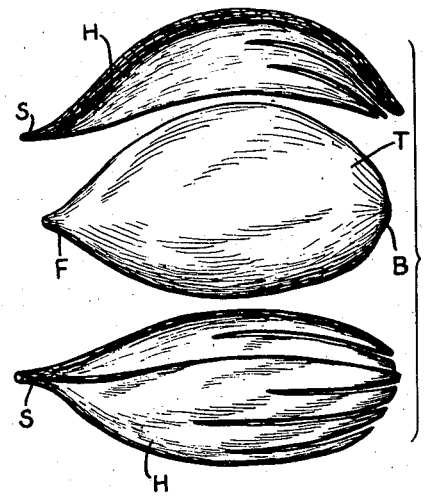
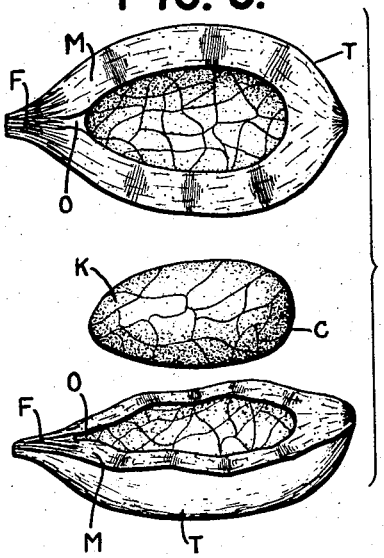
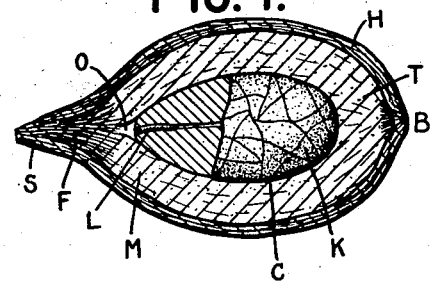
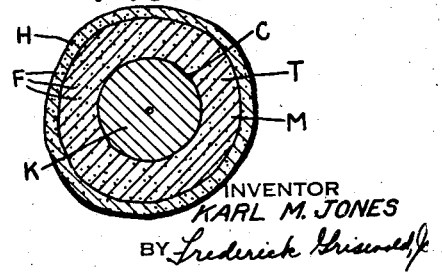

Patented Aug. 7, 1945

2,381,288

UNITED STATES PATENT OFFICE 2,381,288

NUTCRACKING DEVICE

Karl M. Jones, Montclair, N. J.; Elizabeth T. Jones administratrix of said Karl M. Jones, deceased Original application August 7, 1937, Serial No. 157,869. Divided and this application February 19, 1941, Serial No. 379,614

1 Claim. (Cl. 146—9)

This invention is directed to methods of and apparati for dehusking and cracking certain varieties of palm nuts such as nuts of the Cohune variety to separate the shells and kernels.

Nuts of the Cohune variety come in very large clusters of several hundred nuts. Each individual nut is covered by a fibrous husk which can be removed with comparative ease. The shell of these nuts is extremely hard and attempts heretofore made to remove the shells without severely crushing or bruising the internal kernel or meat or mashing the meats with broken pieces of shell have attained little success. When the nuts are "wet," that is, as gathered, it is practically impossible with ordinary methods to crack the shells without crushing the entire nut. When crushed, it is difficult, if not impossible, to separate the kernels or meat from the shell. Valuable oils are extracted from the kernel and the separation of the oil containing kernel and the shell is therefore important.

Many tropical palms produce nuts which, it has been recognized, contain kernels having a high content of valuable oils that are substantially odorless, colorless, and tasteless. These oils can be commerically used for soaps, butter substitutes such as oleomargarine, cooking and salad oils, baker's syrup, candy making, tip-plate flux, and the like. There has heretofore been no commercial process by which the kernels could be separated from the shells in an expeditious manner. In my application Serial No. 157,869 filed August 7, 1937, which became Patent No. 2,234,-157 on March 4, 1941 and of which this application is a division, there is disclosed and claimed the process of extracting the kernels from substantially impenetrable palm nuts of the Cohune variety which comprises cracking the frangible shell, whereby the shell and kernel readily separate after the shell is cracked. Among the nuts to which this invention may be applied and particularly those which have extremely hard and substantially unbreakable shells are those known as Cohune or Cahone, Babassu, Corozo and Coquito. In addition to these there are certain sub-varieties of the general classes just mentioned and also other nuts having local names depending upon the region in which they grow. These include Coyol, Cokerite or Cocorito, as well as Manaca and others. Herein, these nuts are referred to generically as palm nuts of the Cohune variety although some of them may not be within a strict definition of Cohune nuts. The various species of nuts just listed vary in length from about one inch to about three and four inches or even slightly more. The Babassu nut is in the latter group. Many of these nuts have a single pocket and a single kernel therein while others, as for example, the Babassu, have from three to seven kernels separated by membranes extending across the nut from one wall to another so that there are, in effect in the shell, several small pockets. Because of these varying structures it has not been practicable heretofore to use any specific type of mechanism for separating the shells from the kernels.

All of these nuts are characterized by a very hard tenacious, woody shell, the physical properties of which vary according to the condition of the nuts. Although these shells are quite thick compared to the size of the kernel and stone-like in appearance and reaction, they can be broken if sufficient force is applied. Attempts heretofore made to crack these nuts have been unsuccessful because when sufficient force has been applied to break the shell it has been done with a crushing action that transmitted the force applied to the shell to the kernel which was likewise crushed and damaged and in many instances badly mashed with the shell. As a result, the separation of whole kernels was impossible and the crushed or damaged kernels when shipped underwent rapid deterioration by becoming rancid and there was a substantial loss in the quality of the valuable oil in the kernel.

This problem is accentuated if attempts are made to crack the nuts shortly after they are gathered. The nuts are generally ripe but are what is known as "wet." In this condition, it is impossible by the methods heretofore practiced to crack these nuts without substantially mashing the kernel. When, however, the nuts have been seasoned by a drying treatment extending over a long period, the shells can be broken somewhat more readily than when "wet" but even in this condition no commercially practicable process for separating the kernels from the shells has been devised. Attempts have also been made to dry these nuts rapidly by high temperature treatments but this has not to any great extent assisted in the solution of the problem.

The problems in connection with the cracking of such nuts have been increased because of the fact that various nuts within this class differ greatly in size, shape and kernel arrangement. Various mechanical devices have been suggested for cracking these nuts when dry but despite very complicated arrangements, have not proved successful. This is, to a certain measure, due to the variations in the size and structure of the nuts of any given kind or class and also to their inherent hardness. Another factor is that nuts which appear to be uniform on the outside may differ greatly in the number of kernels, their relative sizes and arrangements. Likewise, nuts of a given class may vary from time to time depending upon whether or not they are ripe or green, dry or "wet."

I have discovered a method and devised an apparatus whereby all of the nuts of this general class can be readily cracked in a very simple and expeditious manner and wherein the variations in size or structure of the individual nuts or their physical condition makes little or no difference in the process. That is, if the nuts are properly conditioned before it is attempted to crack the shells, this cracking operation can be readily accomplished. When the nuts are gathered they will be wet although they are ripe. Wet nuts have very tough shells of great inherent tenaciousness and some elasticity resulting in transmitting shocks applied to the shell directly to the kernel and exerting crushing pressure. Attempts heretofore made to crack wet nuts resulted simply in crushing the entire nut since the shell has no frangibility.

Conditioning of the nuts involves making them more frangible. There is a separation of the kernel from the shell proper so that the bond between the surface covering of the kernel and the socket lining is broken throughout substantially the entire contacting surfaces.

My process can be carried out in a continuous manner by employing apparatus such as, for example, that illustrated in the accompanying drawings.

The details of this process will be described in connection with a discussion of the apparatus illustrated in the accompanying drawings but it should be borne in mind that the apparatus shown while convenient for carrying out the process is not essential thereto and other forms of apparatus could be employed. Likewise changes may be made in the details of this apparatus or of the process without departing from the spirit and scope of the invention.

Referring to the drawings:

Figure 2 is a view in elevation of a Cohune nut with the husk or pericarp thereon;

Figure 3 is an exploded view showing a nut with a portion of the removed husk below and another portion of the removed husk above, in section;

Figure 4 is a view in cross-section along the line 4—4 of Figure 2;

Figure 5 is a view in cross-section along the line 5—5 of Figure 2; and

Figure 6 is an exploded view of the broken shell and the freed kernel.

Figure 1:
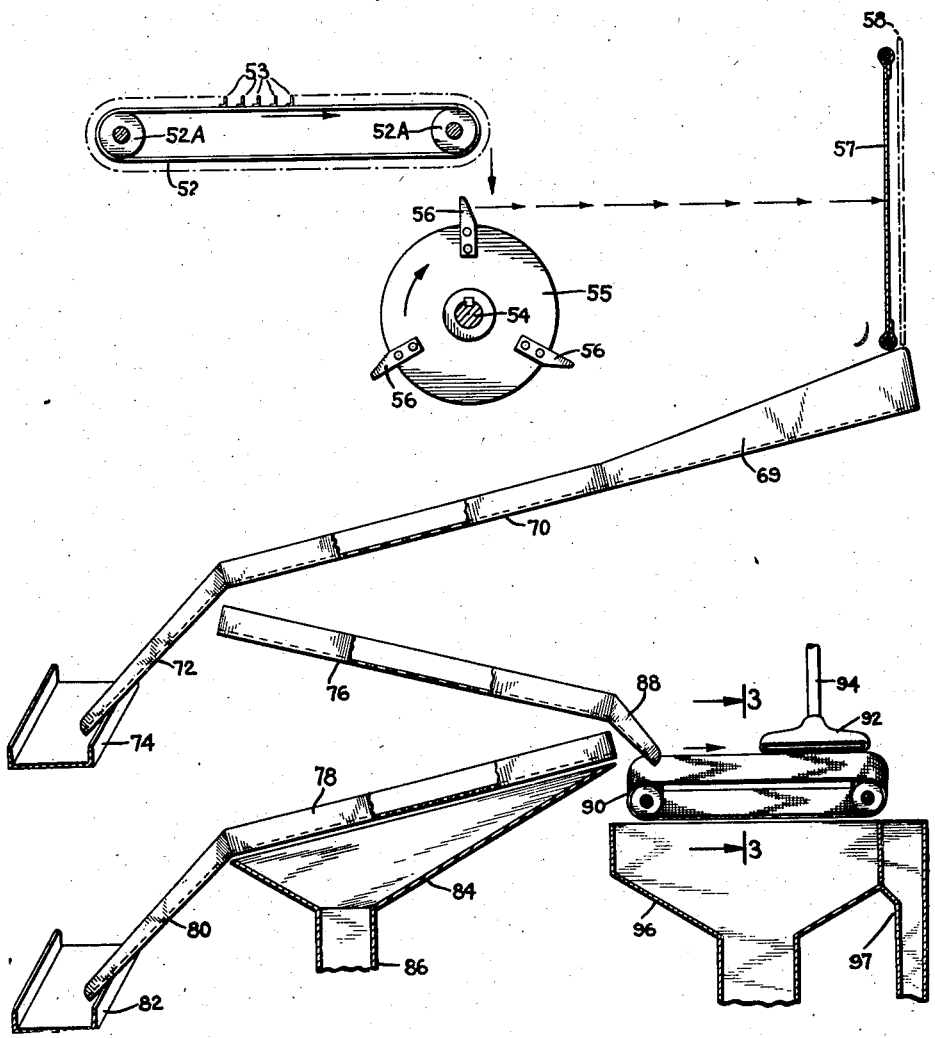
Figure 1 is a view in elevation of a cracking and screening apparatus.

The invention will be described particularly with reference to Cohune nuts, although it is to be understood that this is simply an exemplification of the process which may be applied to other nuts of similar types as described above. Cohune nuts are each covered with a husk or pericarp.

In Figure 2 is illustrated a nut of the Cohune variety with the husk intact and showing the stem S.

The husk H (Figure 3) is generally removed in one or two pieces usually frayed at the end opposite the stem S. Relatively speaking, the husk is not very thick, but has a hard outer layer and a somewhat fleshy pulp-like oil bearing material on the inner surface in contact with the shell T which is fat or solidified oil, part of which clings to the shell and the remainder to the husk when it is removed.

The structure of the entire nut is best illustrated in Figure 4 which shows the nut in longitudinal cross-section. It includes the outer husk H, the thick hard stone-like shell T surrounding and tightly fitting over the kernel K. The shell T is composed of a relatively large number of fibers F which, at the stem end, are not joined in any manner but have somewhat the appearance of a brush. These fibers extend the entire length of the nut from the stem to the base B. For the greater portion of their length, they are firmly encased in a hard, rather fibrous material M which, with the long fibers F, give the shell T great strength. The kernel K is covered by a brown covering C that, in fresh nuts, fits tightly against the kernel socket in the shell T but when the nut is conditioned the varying relative expansion and contraction of the kernel and shell results in freeing the kernel from the socket of the shell T. At one end of the kernel K is the seed L. This seed is near a slight recess O in the fibrous portion that is closed to the outside by the brush-like formation of fibers F and it is through this opening O and the fibers F at the stem end S of the nut that the sprout from the nut grows when conditions are favorable. The kernel is substantially solid except for a very slight cavity along its center the size of which varies with the condition of the nut, being substantially non-existent in a fresh nut and increasing in size as the nut ages and seasons. The kernel K contains from about sixty-five to over seventy percent of a solid white fat which in its composition and properties closely resembles cocoanut oil and melts at about room temperature.

When the nuts are cracked or shelled according to the teachings of this invention, they usually break into two substantially equal halves along a longitudinal plane best seen in Figure 6. The break is, in most instances, irregular and jagged but clean and the kernel in a conditioned nut readily drops from the socket. In the case of multiple kernel nuts the membranes separating the several kernels are also broken sufficiently to permit the kernels to free themselves from the shells.

It is usually desirable to remove the husks before conditioning the nuts prior to cracking and conveniently this may be done with the apparatus shown in Figure 1 for cracking the nuts in a manner hereinafter to be described.

The cracking process herein described is applied after the husk has been removed although this is not essential but simply preferable. It is preferable that the nuts be reasonably ripe in order that the greatest amount of highest grade oil may be extracted from the kernels.

The nuts may be directly passed to the apparatus shown in Figure 1 or an intermediate feeding mechanism may be provided. The cracking mechanism comprises a feeding belt indicated with the reference numeral 52 on which are spaced cleats 53 separated a distance sufficient to receive a nut between each of the cleats with the long axis of each nut across the belt. The belt 52 is adapted to be driven on pulleys 52a by a source of power, not shown. The nuts positioned between the cleats 53 are conveyed to the right as shown in Figure 1 until they reach the end when they drop from the cleats as indicated by the arrow. Beneath the belt 52 is a driven shaft 54 positioned slightly behind the right extremity of the belt 52 and the cleat 53. Mounted on the shaft 54 is a wheel 55 provided, in the modification illustrated in Figure 1, with three projections 56 in the form of paddles having a beveled front face. The shaft 54, to which the wheel 55 is keyed, should be provided with means for rotating the shaft at varying speeds from approximately 500 R. P. M. to as high as 2000 R. P. M. Each of the paddles or projections 56 are bevelled to an extent such that when a particular paddle is in the position beneath the extreme end of the belt 52, it will be substantially vertical so that a nut in dropping from the belt 52 is struck by the rapidly rotating paddle 56 with a very sharp impact that projects the nut in the direction indicated by the arrow to a back-stop 57. For the cracking operation, the back-stop 57 may conveniently be simply a relatively heavy piece of fabric against which the cracked nut, comprising halves of shells and whole kernels, is impinged. Since the nuts have been struck by a sharp impact by the paddle 56, they are cracked at this point and the back-stop 57 is simply to break their flight and cause them to fall down into the apron 69, this being illustrative of one means with which the broken nut may contact without impact for gently arresting its travel to thereby avoid rupture of the oil cells in the released kernel.

The mechanism just described in connection with Figure 1 can also be successfully employed for dehusking the nuts, in which case, the unconditioned nuts having their husks intact, are positioned on the belt 52, spaced by the cleats 53, and fed to the rotating wheel 55, the paddles 56 of which strike against the falling nuts.

The rotating wheel 55, illustrated in Figure 1 and provided with three paddles 56, has been successfully used with a wheel of a diameter of approximately 18 inches where the paddles 56 projected therefrom a distance of about 2½ inches and have a slight bevel. Other forms of wheel have been used, as for example, an 18 inch wheel with two paddles. Where three paddles were employed with old dry nuts speeds of approximately 800 R. P. M. were most successful. For fresh wet nuts, 1000 R. P. M. was required. With two paddles, a higher speed could be employed. With smaller wheels, the speed is, as a general rule, increased, in order that the velocity of the paddle when striking the nut will be substantially the same as in the case of the 18 inch wheel rotating at the speeds indicated. It will be evident, of course, that variations may be made in the arrangement and construction of the wheel 55 and paddles 56, as will be evident to those skilled in the art.

It will thus be seen that I have provided a method whereby nuts of the Cohune variety which heretofore could not be satisfactorily cracked by commercial processes can readily be cracked. While certain preferred embodiments of the invention, as exemplified in the apparatus described, have been given, it is to be understood that these are not to be considered as limiting the invention but illustrative of it, the scope of the invention being set forth in the appended claim.

What is claimed is:

In an apparatus for cracking nuts, the combination of a belt provided with means to space nuts of the Cohune variety and to drop them individually at the end of the belt, a rotatable member mounted below the discharge end of said belt, a projection from said rotatable member adapted to pass through a vertical plane at the said end of said belt, said projection serving to crack the nut with a single impact for separating the shell and kernel, and means against which the broken nut contacts without impact for gently arresting its travel, thereby avoiding rupture of the oil cells in the released kernel.

KARL M. JONES.